Sept. 5, 1933.  A. LYSHOLM  1,925,148
HIGH TEMPERATURE TURBINE
Filed March 21, 1931   2 Sheets-Sheet 1

INVENTOR
A. Lysholm
BY
Wm. J. Hedlund
ATTORNEY

Sept. 5, 1933.　　　　　A. LYSHOLM　　　　1,925,148
HIGH TEMPERATURE TURBINE
Filed March 21, 1931　　　2 Sheets-Sheet 2

Patented Sept. 5, 1933

1,925,148

UNITED STATES PATENT OFFICE 1,925,148

HIGH TEMPERATURE TURBINE

Alf Lysholm, Stockholm, Sweden, assignor to Aktiebolaget Milo, Stockholm, Sweden, a Swedish joint-stock company Application March 21, 1931, Serial No. 524,289, and in Germany March 24, 1930

9 Claims. (Cl. 253—16.5)

This invention relates to elastic fluid turbines and more particularly to turbines operated by a high temperature driving fluid.

In turbine practice it is desirable to utilize a driving fluid at high temperature and high pressure in order to obtain the maximum power in a turbine of small dimensions. The use of high temperatures is particularly important in gas turbines as the total energy in the driving fluid is increased by increase in temperature and without increasing the power requirements of the compressor. The temperatures that may be used however, are limited by the heat resisting characteristics of the materials of construction. Materials generally used in turbine construction are not capable of withstanding the high temperatures which are desirable for gas turbine work and materials having higher heat resisting characteristics are economically unsuitable for constructional parts.

An object of the present invention is to overcome these difficulties and to provide a turbine which is capable of withstanding high operating temperatures. This is accomplished in general by constructing the turbine of usual materials and lining or shielding the parts which come into contact with the hot driving fluid by a material having higher resistance to the mechanical stresses and to the chemical action of the driving fluid, for example corrosion, which are involved at high temperatures. These properties will be herein referred to for convenience as heat resisting characteristics.

Further features distinguishing the invention will be more fully explained in the following in referring to the accompanying drawings.

Figure 1:
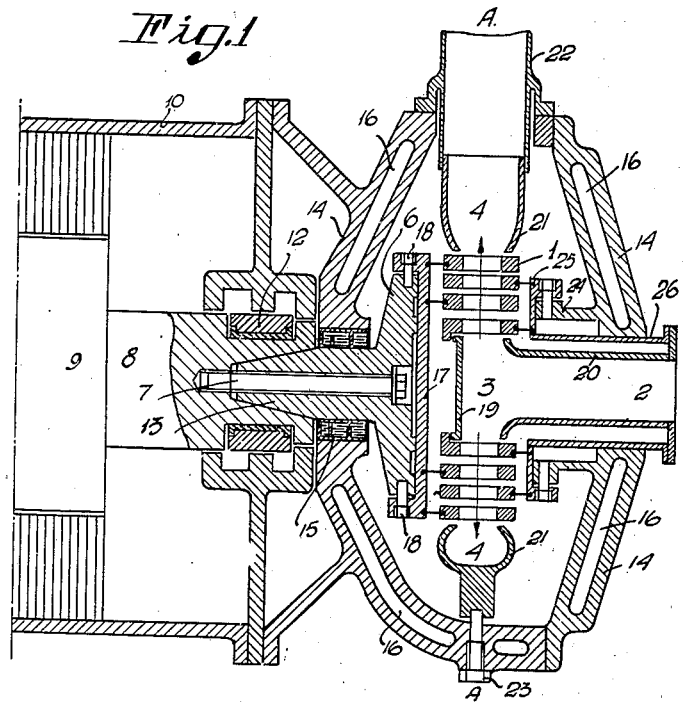
Fig. 1 shows a horizontal section of a turbine according to the invention.

In Fig. 1, 1 indicates an overhung radial flow blade system, to which driving fluid is introduced through the admission conduit 2. Said fluid flows from the central chamber 3 in radial direction through the blade system comprising a plurality of concentric rings of blades towards the channel 4, from which it is discharged through the outlet conduit 5.

Of the radial flow blade system 1 alternate blade rings rotate, and these blade rings are fastened to an overhung turbine disk or rotor 6 which is secured in known manner to a rotor shaft 8. The shaft 8 forms a part of a driven aggregate, for instance an electric generator 9, and is journalled in a bearing 12 which is fitted in a casing 10 surrounding the generator 9. The turbine disk 6 is provided with a conically tapered shaft part 13 which may be made integral therewith, and extends through a labyrinth packing 15 which is fitted in the turbine casing 14 surrounding the blade system 1. The turbine casing 14 is provided with double walls, between which a channel 16 is formed, in which water is circulated for cooling purposes. In order to prevent the driving medium at its high temperature from coming into contact with those parts of the turbine, for instance with the turbine disk 6 and the turbine casing 14, which are not made of high heat resisting material, these parts are provided with a protecting lining or shielding member of heat resisting material. Thus the turbine disk 6 is lined with a plate 17 of heat resisting material fastened to the same by means of studs 18. Further, the admission conduit 2 and the walls of the central chamber 3 in the turbine are covered with protecting linings or shielding members 20 and 19, respectively, which prevent the driving medium from coming into contact with the non-heat resisting material. Shielding member 19 is carried by the innermost blade ring. Also the walls 21 forming the outlet channel 4 are formed of heat resisting material. Finally also the flange or disk 24 carrying the stationary blade rings of the blade system, is provided with a protecting lining 25 which by means of studs is fitted to the flange 24. This protecting lining 25 is fastened to a special wall 26 located externally of the wall 20. The heat transfer to the turbine casing 14 is thus retarded. The different blade rings are fastened by flexible couplings through the intermediary of the heat resisting linings 17 and 25 to the turbine disk 6 and to the flange 24, respectively. These linings as well as the wall 21 surrounding the outlet chamber 4, and the wall 22 surrounding the outlet 5, direct the driving medium flowing through the blade system in such a manner that it does not come into contact with the turbine casing.

Figure 2:
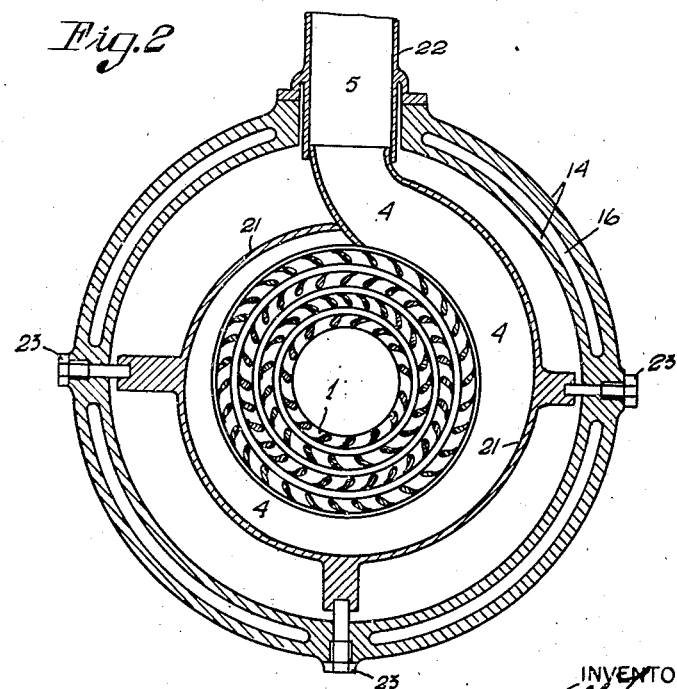
Fig. 2 shows a section through the turbine along line A—A in Fig. 1.

In Fig. 2, in which the same reference numerals are used as for corresponding parts in Fig. 1, is shown how the walls 21 of the outlet 4, which are formed of heat resisting material, are made in spiral form, so that the outlet gradually widens to the outlet conduit 5. The walls of the outlet 4 are connected with the turbine casing by studs 23 which render possible the expansion of the outlet 4.

Figure 3:
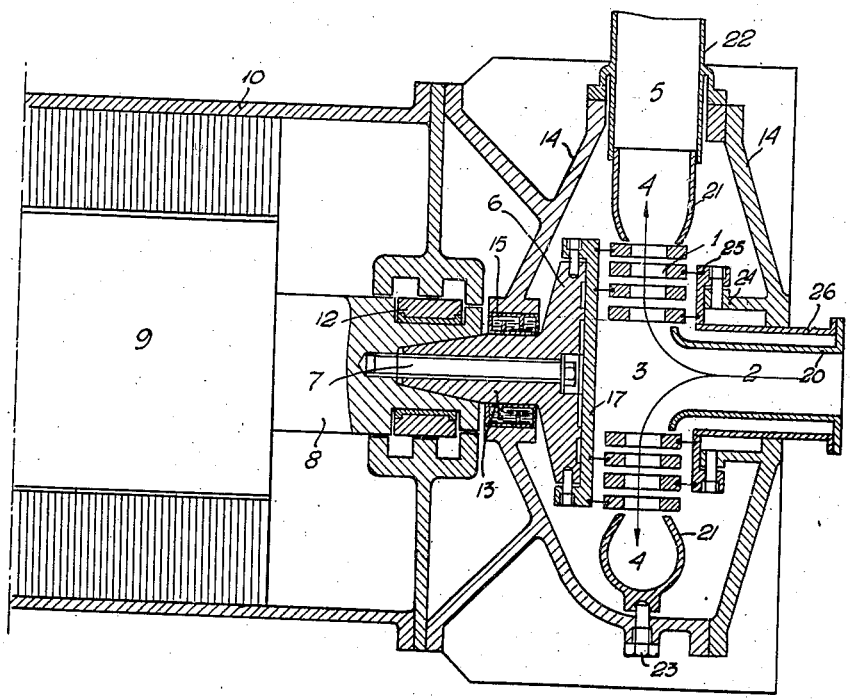
Fig. 3 shows a modification of the construction shown in Fig. 1.

Fig. 3, in which the same designations are used as previously for corresponding parts, shows a simplified form of the invention. Also in this case the admission conduit 2 of the radial blade system, leading to the center 3, is provided with a protecting lining 20. The central chamber is, as previously, also confined in axial direction by a lining 17 protecting the turbine disk 6. The flexible couplings, by which the blade rings are connected with the turbine disk 6 and the flange 24, respectively, prevent the driving fluid from leaking out on the sides of the radial blade system to the space between the turbine casing 14 and the walls 21 which form the outlet 4. It is also evident that arrangements can be made in the usual way to prevent the driving fluid from leaking out between the blade rings, both in this embodiment and in that shown in Figs. 1 and 2. In the embodiment shown in Fig. 3, however, the turbine casing is not provided with a jacket for cooling water. This embodiment may be used for turbines, in which the starting temperature of the driving medium is not so high that the portion of the driving medium which expands through the blade system or leaks into the space close to the turbine casing, attains a temperature which is detrimental to the casing material. The disk 17, made of heat resisting material and fitted in known manner by means of studs 18 as protecting lining to the turbine disk 6, protects also the bolt 7 which connects the conically tapered shaft port 13 of the turbine disk 6 with the shaft 8 driven by the turbine.

As an air space is arranged between the protecting disk 17 and the turbine disk 6, a certain degree of heat insulation is acquired against the high temperature, whereby the heat transfer to the bearings 15 and 12 is retarded. Also the protecting lining 22, forming the walls of the outlet conduit 5, is so fitted to the turbine casing 14, that an insulating layer is formed between the lining 22 and the turbine casing 14. According to this principle, the other linings can also be applied to those parts which require protection. Thus, for instance the shell 20 around the admission conduit 2, allows the provision of an insulating air layer for the turbine casing 14 or the shell 26. The outlet 4 is also provided with walls 21 which are mounted at a certain distance from the turbine casing 14.

The heat resisting material, of which the protecting parts are made, may consist of chromium-nickel-molybdenum steel, though they may be made of any other material that can be considered heat resisting. The turbine shown in the drawings is designed as a back pressure turbine. When gas is used as the driving medium, this gas is preferably produced by compressing air to high pressure and heating it by internal combustion of fuel therewith, whereby the heating takes place without increase of the pressure of the driving medium.

By using linings according to the invention, turbines can be built for high temperatures corresponding to the heat resisting characteristics of the protecting material while other parts may be made of the same material as hitherto used.

It is even possible to employ the usual method of manufacture for most of the turbine parts. When using single rotating radial flow turbines the path for the driving medium through the turbine is very short and need not, as is the case in axial turbines, be limited outwardly by walls, for which reason nozzles or other governing members for the driving medium are superfluous and consequently the risk of burning the material is reduced.

What I claim is:—

1. In an elastic fluid turbine, a rotor shaft, a rotor overhung on said shaft, a radial flow blade system comprising a plurality of concentric rings of blades axially to the side of the rotor opposite said shaft and providing a path of flow for driving fluid generally normal to the axis of rotation of the shaft, and means for preventing transmission of heat axially of the turbine from said path to said rotor comprising a shielding member interposed between said rotor and said blade system, said member being mounted on said rotor and providing a support for some of said rings of blades.

2. In an elastic fluid turbine, a rotor shaft, a rotor overhung on said shaft, a radial flow blade system comprising a plurality of concentric rings of blades axially to the side of the rotor opposite said shaft and providing a path of flow for driving fluid generally normal to the axis of rotation of the shaft, and means for preventing transmission of heat axially of the turbine from said path to said rotor comprising a shielding member interposed between said rotor and said blade system, said member being mounted on said rotor and providing a support for some of said rings of blades and portions of adjacent faces of said rotor and said shielding member being spaced apart to provide insulating spaces therebetween.

3. In an elastic fluid turbine, a rotor shaft, a bearing for supporting said shaft, a rotor overhung on said shaft adjacent to said bearing, a radial flow blade system comprising a plurality of concentric rings of blades axially to the side of said rotor opposite said bearing and providing a path of flow for driving fluid generally normal to the axis of rotation of the shaft, and means for preventing transmission of heat axially of the turbine from said path to said bearing comprising a shielding member interposed between said rotor and said blade system, said member being mounted on said rotor and providing a support for some of said rings of blades.

4. In an elastic fluid turbine, a rotor shaft, a disc-like rotor overhung on said shaft, a radial flow blade system comprising a plurality of concentric rings of blades axially to the side of said rotor opposite said shaft and providing a path of flow for driving fluid generally normal to the axis of rotation of the shaft, means for preventing transmission of heat axially of the turbine from said path to said shaft comprising a plate-like shielding member interposed between said rotor and said blade system, a plurality of radially extending studs for mounting said shielding member on said rotor, whereby to permit radial expansion of said shielding member with respect to said rotor and flexible coupling members for mounting some of said rings of blades on said shielding member.

5. In an elastic fluid turbine, a casing, a rotor shaft, a rotor overhung on said shaft within said casing, a radial flow blade system comprising a plurality of concentric rings of blades axially to the side of the rotor opposite said shaft and providing a path of flow for driving fluid generally normal to the axis of rotation of the shaft, means for preventing transmission of heat axially of the turbine from said path of flow comprising a first plate-like shielding member interposed between said blade system and said rotor and a second plate-like shielding member interposed between said blade system and said casing at the side of the blade system axially opposite said rotor, a plurality of radially arranged studs for securing one of said plate-like members to the rotor and the other of said plate-like members to the casing, flexible coupling members for mounting some of the rings of blades on the first plate-like member and flexible coupling members for mounting others of the rings of blades on said second plate-like member.

6. In an elastic fluid turbine, a rotor shaft, a rotor overhung on said shaft, a radial flow blade system comprising a plurality of concentric rings of blades axially to the side of said rotor opposite said shaft and providing a path of flow for driving fluid generally normal to the axis of rotation of the shaft, means providing an inlet conduit for admitting driving fluid to said blade system axially and centrally of the turbine from the side thereof opposite said shaft and means for preventing transmission of heat axially of the turbine from the driving fluid admitted to said blade system through said inlet conduit comprising a first shielding member mounted on said rotor between the rotor and the blade system and a second shielding member carried by the innermost blade ring between said conduit and said first shielding member.

7. In an elastic fluid turbine, a casing, a rotor shaft, a rotor overhung on said shaft within said casing, a radial flow blade system comprising a plurality of concentric rings of blades in said casing axially to the side of said rotor opposite said shaft and providing a path of flow for driving fluid generally normal to the axis of rotation of the shaft, a first disc-like shielding member interposed between said blade system and said rotor, said shielding member being mounted on said rotor and carrying some of said rings of blades, a second annular disc-like shielding member interposed between said casing and said blade system on the side of the blade system opposite said first shielding member and carrying others of said rings of blades and means providing an inlet conduit for admitting driving fluid axially and centrally of the turbine through the annular shielding member from the side of the turbine opposite said shaft.

8. In an elastic fluid turbine, a casing, a rotor shaft, a rotor overhung on said shaft within said casing, a radial flow blade system comprising a plurality of concentric rings of blades in said casing axially to the side of said rotor opposite said shaft and providing a path of flow for driving fluid generally normal to the axis of rotation of the shaft, a first disc-like shielding member interposed between said blade system and said rotor, said shielding member being mounted on said rotor and carrying some of said rings of blades, a second annular disc-like shielding member interposed between said casing and said blade system on the side of the blade system opposite said first shielding member and carrying others of said rings of blades, and means providing an inlet conduit for admitting driving fluid axially inlet conduit for admitting driving fluid axially and centrally of the turbine from the side thereof opposite said rotor, said last named means comprising an outer part fixed to said casing and an inner part radially spaced from said outer part, said inner part being fixed to said outer part at a place remote from said blade system and being freely expansible axially and radially within the turbine.

9. In an elastic fluid turbine, casing structure providing a bearing, a rotor shaft mounted in said bearing, a rotor overhung on said shaft, a radial flow blade system comprising a plurality of concentric rings of blades axially to the side of said rotor opposite said shaft and providing a path of flow for driving fluid generally normal to the axis of rotation of the shaft, means for preventing transmission of heat axially of the turbine from said path to said bearing by conduction through said rotor comprising a shielding member interposed between said rotor and said blade system and providing a support for some of said rings of blades and means for preventing transmission of blades and means for preventing transmission to said bearing by conduction through said casing structure of heat from driving fluid discharged from said path of flow comprising means forming an outlet channel for driving fluid spaced from said casing structure and encircling said blade system, said last mentioned means being mounted to permit radial expansion thereof with respect to said casing structure.

ALF LYSHOLM.